United States Patent
Seckin et al.

(10) Patent No.: US 7,599,307 B2
(45) Date of Patent: Oct. 6, 2009

(54) QUALITY OF EXPERIENCE (QOE) METHOD AND APPARATUS FOR WIRELESS COMMUNICATION NETWORKS

(75) Inventors: Gamze Seckin, Redmond, WA (US); Raghavendra C. Nagaraj, Mercer Island, WA (US); Lalit Sarna, Mountain View, CA (US); Alan Tseng, San Jose, CA (US); Jayank M. Bhalod, Kirkland, WA (US); Yanda Ma, Redmond, WA (US)

(73) Assignee: Vidiator Enterprises Inc., Nassau, New Providence (BS)

( * ) Notice: Subject to any disclaimer, the term of this patent is extended or adjusted under 35 U.S.C. 154(b) by 668 days.

(21) Appl. No.: 10/924,740

(22) Filed: Aug. 23, 2004

(65) Prior Publication Data
US 2005/0089043 A1 Apr. 28, 2005

Related U.S. Application Data

(60) Provisional application No. 60/539,536, filed on Jan. 26, 2004, provisional application No. 60/497,447, filed on Aug. 21, 2003.

(51) Int. Cl.
*G01R 31/08* (2006.01)
*G06F 15/16* (2006.01)

(52) U.S. Cl. .................... 370/252; 709/203; 709/228

(58) Field of Classification Search ......... 370/229–235, 370/238, 252, 253, 346, 389, 400, 395.1, 370/395.21, 395.2, 395.4, 401, 437, 465, 370/468, 477; 709/203, 220–222, 224, 226, 709/230–234
See application file for complete search history.

(56) References Cited

U.S. PATENT DOCUMENTS

| | | | | |
|---|---|---|---|---|
| 6,954,435 B2* | 10/2005 | Billhartz et al. | ............. | 370/252 |
| 7,328,262 B2* | 2/2008 | McDonagh et al. | ......... | 709/224 |
| 7,346,007 B2* | 3/2008 | Curcio et al. | ............... | 370/252 |
| 2002/0120766 A1* | 8/2002 | Okajima et al. | ............. | 709/232 |
| 2003/0232614 A1* | 12/2003 | Squibbs | ..................... | 455/405 |
| 2004/0058652 A1* | 3/2004 | McGregor et al. | ....... | 455/67.13 |

FOREIGN PATENT DOCUMENTS

WO    WO 00/33511    6/2000

(Continued)

OTHER PUBLICATIONS

Gabin, M. Draft Rel-6 PSS Quality Metrics Permanent Document, Nov. 24, 2003, 3GPP TSG-SA4 Meeting #29, pp. 1-19, (http://www.3gpp.org).*

(Continued)

*Primary Examiner*—Aung S Moe
*Assistant Examiner*—Redentor M Pasia
(74) *Attorney, Agent, or Firm*—Schwabe, Williamson & Wyatt, P.C.

(57) ABSTRACT

A Quality of Experience (QoE) framework provides a technique to assess the end user experience in a mobile wireless communication environment, such as 2.5G or 3G networks, or in any other wireless or hardwired communication environment. The framework is usable in conjunction with media streaming applications and enables a combination of network layer, transport layer, codec layer, and application layer measurements in extracting results. The extracted results can be used to monitor and improve, if necessary, the end user experience over severely variable network conditions.

33 Claims, 4 Drawing Sheets

FOREIGN PATENT DOCUMENTS

WO      WO 02/32097 A    *    4/2002

OTHER PUBLICATIONS

3$^{rd}$ Generation Partnership Project; Technical Specification Group Services and System Aspects; Transparent End-to-End Packet-Switched Streaming Service (PSS) Protocols and Codecs (Release 6), pp. 1-94, Jun. 1, 2004.

Ricardo, M. et al., "Support of IP QoS Over UMTS Networks," IEEE 4, pp. 1909-1913, Sep. 15, 2002.

* cited by examiner

QUALITY OF EXPERIENCE (QOE) METHOD AND APPARATUS FOR WIRELESS COMMUNICATION NETWORKS

CROSS-REFERENCE TO RELATED APPLICATIONS

This application claims the benefit of U.S. Provisional Patent Application No. 60/497,447 filed Aug. 21, 2003; and U.S. Provisional Patent Application No. 60/539,536 filed Jan. 26, 2004, where these two provisional applications are assigned to the same assignee as the present application and are incorporated herein by reference in their entireties.

TECHNICAL FIELD

The present disclosure relates generally to communication networks, and in particular but not exclusively, relates to techniques assess end user experience or Quality of Experience (QoE) in a mobile wireless and/or hardwired communication environment.

BACKGROUND INFORMATION

With developments in media compression and wireless network infrastructures, media streaming has become a promising area of technology for end-users, content providers, wireless operators, and other entities. Although there will be more bandwidth available for wireless technologies such as 2.5G or 3G and despite the fact that some of the advanced compression techniques enable very low-bit-rate streaming, there are inherent problems when it comes to the wireless environment.

Areas of wireless streaming applications where such problems are encountered include real-time media applications (including both audio and video streaming), real-time audio applications (such as live music or sports broadcasts), off-line media applications, and off-line audio applications. Unlike wired networks, wireless networks suffer from high rates of effective packet loss and intermittent packet delays. Packet loss and delays may be caused by factors such as network congestion, bit error rates, or data overflow at the user's device apart from effects, such as fading, which is an inherent characteristic of wireless networks.

In addition to packet loss, there are other factors that adversely affect the media received by the end user. The effect of any of these factors on the user experience can vary greatly depending on communication channel conditions, user device characteristics, environmental conditions, voluntary or involuntary events that occur during communication, or other influences.

All of the above-described and other factors ultimately adversely affect the Quality of Experience (QoE) for the end user in a mobile wireless communication environment in the context of media delivery and consumption, wherein streaming is but one example of media delivery. These same or other factors can also affect the QoE for the end user in a hardwired communication environment.

BRIEF SUMMARY OF THE INVENTION

One aspect provides a method usable in a wireless communication environment. The method includes defining at least one quality of experience (QoE) metric indicative of a characteristic that affects quality in the wireless communication environment. A negotiation is performed between a client and a server to determine which of the at least one QoE metric is to be used during a session between the client and the server, and such QoE metric is designated as an accepted QoE metric. Data for one or more accepted QoE metrics is collected during the session, and the metric data is communicated between the client and the server.

BRIEF DESCRIPTION OF THE SEVERAL VIEWS OF THE DRAWINGS

Non-limiting and non-exhaustive embodiments are described with reference to the following figures, wherein like reference numerals refer to like parts throughout the various views unless otherwise specified.

DETAILED DESCRIPTION

In the following description, numerous specific details are given to provide a thorough understanding of embodiments. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Unless the context requires otherwise, throughout the specification and claims which follow, the word "comprise" and variations thereof, such as, "comprises" and "comprising" are to be construed in an open, inclusive sense, that is as "including, but not limited to."

The headings provided herein are for convenience only and do not interpret the scope or meaning of the claimed invention.

As an overview, one embodiment of the QoE framework provides a technique to monitor and address QoE issues that may arise during communications between network components. For example, there may be QoE issues that may arise during communications between a server and a client (e.g., end user device) when media is being communicated from the server to the client. The components of the QoE framework of one embodiment includes initiation and termination processes that respectively define the beginning and end of a session; a negotiation process wherein the server and the client negotiate which metric(s) to use during the session; one or more metrics that are defined and implemented (e.g., collection/measurement of metric values); transportation during the session of metric values pertaining to metrics at a predefined frequency and for a predefined range of the session all of which have been accepted during the negotiation; and analysis/application of the metric values to evaluate the QoE and adjust conditions so that the QoE can be improved, if necessary.

Various embodiments will be described herein in the context of the QoE framework in wireless communication networks. It is appreciated that the invention is not limited to the wireless environment. Embodiments of the QoE framework may be applied to hardwired communication networks (including communication networks comprising both hardwired and wireless elements) or any other network that may experience QoE issues.

Simply for the sake of illustration and explanation, various embodiments are described herein using standards and/or protocol-specific terminology, processes, formats, or other protocol-specific implementations. For example, certain embodiments are described with respect to Session Description Protocol (SDP), Real Time Streaming Protocol (RTSP), and other standards/protocols. These specifically described implementations are not intended to limit the invention. Rather, such standards/protocol-specific descriptions are merely intended to assist the reader (or a person skilled in the art) in understanding operation and features of certain example embodiments when implemented in conjunction with the well-known standards/protocols. From these specific descriptions herein, a person skilled in the art would be able to acquire knowledge with regards to how to make and use other embodiments of the invention for other standards/protocols (currently existing or to be developed in the future) or for other applications where QoE issues arise.

One such specific but non-limiting example embodiment of the QoE framework leverages existing streaming description and control protocols such as SDP (see, e.g., RFC 2327: SDP: Session Description Protocol, Handley M. and Jacobson V., April 1998) [2] and RTSP (see, e.g., RFC 2326: Real Time Streaming Protocol (RTSP), Schulzrinne H., Rao A. and Lanphier R., April 1998) [3] by providing standards-compliant extensions to them. An embodiment also allows existing standards-based reporting mechanisms, such as RTCP (see, e.g., RFC 3550: RTP: A Transport Protocol for Real-Time Applications, Schulzrinne H. et al., July 2003) [4] and RTCP XR (see, e.g., RFC 3611: RTP Control Protocol Extended Reports (RTCP XR), T. Friedman et al., November 2003) [5], to be incorporated. The numerals in brackets [ ] assigned to each of these references will be used subsequently throughout this description as a short-hand technique to refer to these references.

An embodiment of the QoE framework also defines a set of QoE parameters (metrics), such as corruption duration, rebuffering duration, initial buffering duration, successive loss, frame rate deviation, and/or jitter duration. These or other suitably defined metrics may be used singly or in any practical combination.

Figure 1:
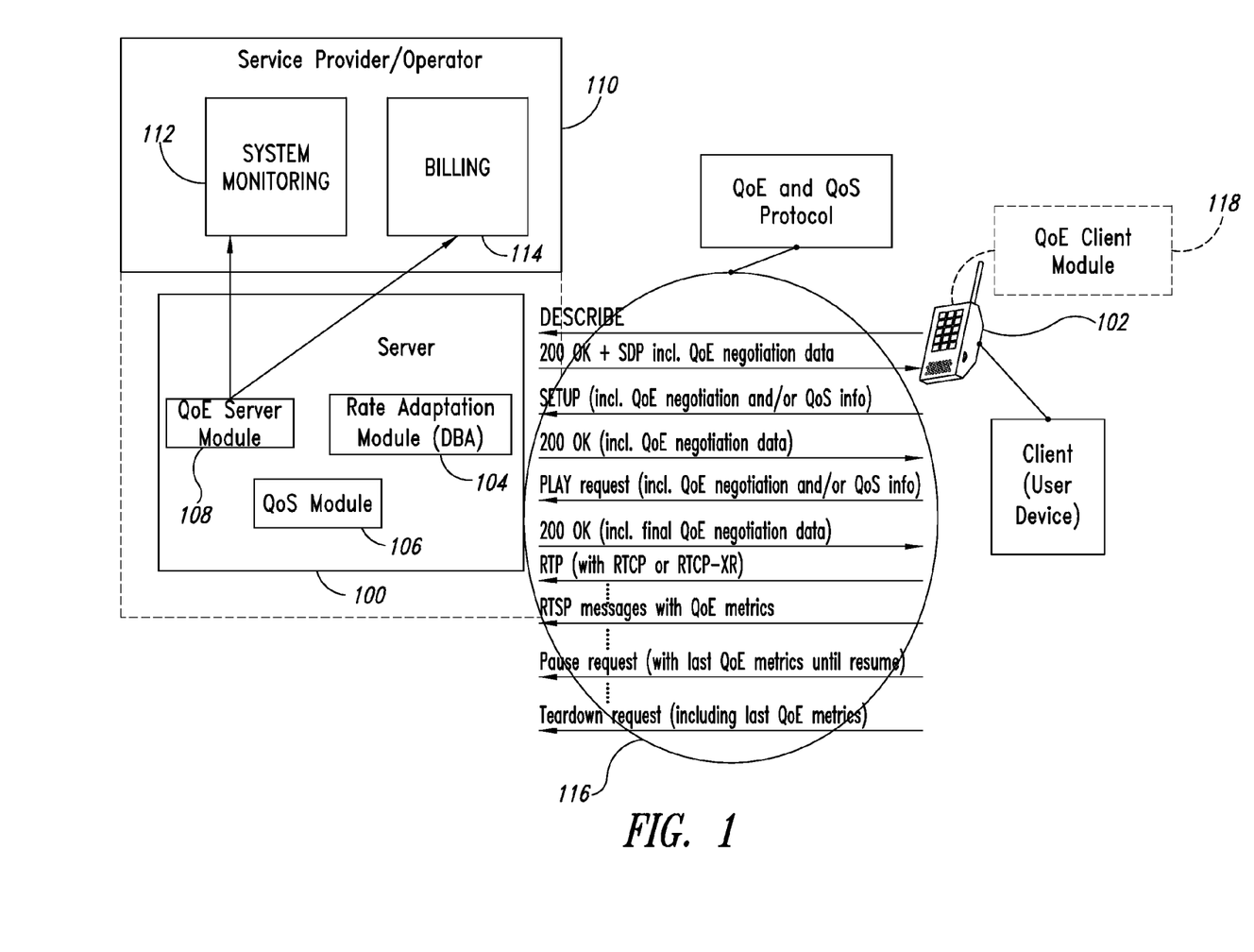
FIG. 1 is a functional block diagram illustrating QoE framework components and operation thereof according one embodiment.

FIG. 1 shows a diagram of the components involved in the QoE framework according to an embodiment. A server 100 and a client 102 are shown communicating with each other by way of a QoE and quality of service (QoS) protocol. One suitable but non-limiting example of the client 102 is any 3GPP Release 6-compliant handset/player that supports the QoE protocol and the minimal set of defined metrics (for example, defined in S4-040308 Working Draft 26234-050, 3GPP TSG-SA4 Meeting #31, Montreal, Canada, May 17-21, 2004) [1] can communicate with the server 100 or network component. One embodiment of the client 102 includes a QoE Client Module 118, which will be described in further detail later below.

An embodiment of the server 100 incorporates a Dynamic Bandwidth Adaptation (DBA) module 104, a Quality of Service (QoS) module 106, and a QoE Server Module 108. The QoS module 106 leverages the negotiated maximum bitrate, guaranteed bitrate, and maximum transfer delay parameters between the client 102 and the network. It also leverages any additional network layer data such as loss, delay, and others. Example embodiments of the DBA module 104 are described in further detail in U.S. application Ser. No. 10/452,035, entitled "METHOD AND APPARATUS FOR DYNAMIC BANDWIDTH ADAPTATION," filed May 30, 2003, assigned to the same assignee as the present application, and incorporated herein by reference in its entirety.

All of these modules cooperatively ensure that the user experience is as expected and is monitored throughout the streaming session even over severely variable network conditions. A service provider/operator 110 can feed the QoE Server Module's 108 outputs to a system-monitoring module 112, to a billing module 114 (provided the handset is authenticated), or to any other module. The QoE Server Module 108 of one embodiment can be customizable to the needs of the component it plugs in, and can provide statistical analysis of the QoE metrics, and the QoS parameters.

While the QoE Server Module 108 of the depicted embodiment is shown as residing in the server 100, it is appreciated that the QoE module (or any of the other modules) can be suitably located elsewhere in the wireless or hardwired network. For example, the QoE Server Module 108 can be located at a proxy device, router, switch, or other network component, including at client(s) 102 in some embodiments.

One of the QoE framework's features is to offer to service providers 110 a means to evaluate the end user experience. The QoE framework of one embodiment could be used for billing or handset/player benchmarking purposes. Such use can be enhanced provided that trusted metrics feedback can be substantially ensured.

The description below is organized as follows. Section I describes the QOE protocol aspects. Section II describes the QOE metrics aspects. Section III describes the QOE Server Module aspects. Section IV describes the QOE Client Module aspects.

I. QoE Protocol

In a specific but non-limiting embodiment, the RTSP and SDP-based protocol extensions are used for transport and negotiation of the QoE metrics between the packet switched streaming service (PSS) client 102 and the PSS server 100, for example. Of course, transport and negotiation of the QoE metrics can use other mechanisms alternatively or additionally to RTSP and SDP. An example embodiment of the negotiation and transport processes of a QoE protocol 116 is depicted in FIG. 1.

The QoE metrics negotiation starts with the response to the DESCRIBE request sent from the client 102, if the metrics information is embedded in the SDP data. For the case of locally stored SDP that contains QoE-Metrics attribute, the negotiation starts with the client's 102 SETUP request. If the PSS client 102 supports QoE metrics, then the client 102 sends a SETUP request containing the selected (i.e., accepted by the client 102)/modified (for re-negotiation) QoE metrics for either session level, or the media level, which is being set-up.

Upon receiving this SETUP request, the server 100 returns the RTSP Response with the "accepted" QoE metrics (i.e., metrics and metrics values that are identical to the ones in the client's 102 request and accepted by the server 100) and the "re-negotiation" QoE metrics (i.e., metrics and metrics values that are not identical to the ones in the client's 102 request and modified for re-negotiation by the server 100). The echoing of the "accepted" QoE metrics is for re-acknowledging the client 102. The server 100 may also reject the changes made by the client 102 (i.e., reject the "re-negotiation" QoE metrics). If the server 100 rejects the changes, the server 100 either sets new values and resends the modified metrics back to the client 102, or the server 100 ignores the "re-negotiation" metrics and does not re-acknowledges them. Any QoE metric that has been acknowledged as "accepted" by the server 100 are not re-negotiated (i.e., it need not be resent in the "3GPP-QoE-Metrics" header in the next RTSP request and need not be re-acknowledged in the next RTSP response).

If the server 100 does not approve the modifications done by the client 102, the server 100 and the client 102 continues to re-negotiate until the RTSP PLAY request and the server 100 echoes the "accepted" QoE metrics in the RTSP PLAY response. The client 102 can terminate the negotiation process by issuing an RTSP PLAY request. It is noted that each time the "QoE-Metrics" header field is sent in an RTSP request, it is also present in the response corresponding to that particular request. Otherwise, the receiver of the response assumes that the other end does NOT support QoE metrics.

If there is no DESCRIBE-RTSP Response pair sending at the beginning of the RTSP signaling (see, e.g., FIG. 2), it means that the SDP description is received by other means. If such an SDP contains the "3GPP-QoE-Metrics" attribute, the negotiation happens in the same way as it is described above (i.e., starts with SETUP request containing "3GPP-QoE-Metrics" header). If the SDP does not contain the "3GPP-QoE-Metrics" attribute and the server 100 would still like to check whether the client 102 supports QoE Protocol or not, the server 100 includes the "3GPP-QoE-Metrics" header containing the initial QoE metrics in the SETUP response. If the PSS client 102 sends the QoE metrics information in the next request (indicating that it supports QoE Protocol), the negotiation continues until the mutual agreement is reached or RTSP PLAY request and response message pair is issued. If the client 102 does not send QoE metrics information in the next request to SETUP response, then the server 100 assumes that the client 102 does not support QoE metrics.

For performance and complexity reasons, QoE metrics renegotiation during streaming need not be done in an embodiment. However it is possible to turn off the metrics during a streaming session. The metrics can be set to "Off" at session level or at media level, for example. The request uniform resource locator (URL) indicates what level is used. If no URL is used, then "Off" applies to session level. The server 100 can use OPTIONS (with Session ID) or SET_PARAMETER RTSP methods to turn off the QoE feedback.

The client 102 does not send QoE feedback during RTSP ready state. After the ready state is ended (i.e., RTSP state=playing), the periodical feedback and normal operations continue. This reduces the network load in the uplink and downlink directions, and the processing overhead for the PSS client 102. When an RTSP PLAY request is sent by the PSS client 102 after a PAUSE, the clock for measuring the reporting period (based on the defined "Sending Rate") is reset.

If there are multiple non-aggregated sessions (i.e., each media delivery is initiated by a different PLAY request), the QoE metrics are negotiated and reported for each session separately.

Again, it is to be emphasized that the above-described (and also subsequently described in sections I.A-I.F below) specific and implementation-centric embodiment(s) of the portion(s) of the QoE protocol is merely for illustrative purposes and is not intended to be limiting of the invention. A more general description of the protocol can be summarized as follows: a session is initiated between the server 100 and the client 102; some metrics may or may not be supported by either or both the server 100 and the client 102; also, the client 102 may choose to include a subset of the metrics it supports for a particular session; the client 102 and the server 100 therefore engage in a negotiation process, which can involve several back and forth exchanges, to determine with metrics are supported and should be sent by the client 102, how often the supported/accepted metrics should be sent, how to activate and/or deactivate the metrics, the content or value(s) that the accepted metrics are to contain, and other metric-related factors; measurement and collection of metric values by the client 102; transporting the metric values from the client 102 to the server 100; and termination of the session. The transported metric values can be evaluated to determine if the QoE can or should be improved during the streaming session and/or for subsequent sessions. More detailed and non-limiting descriptions of embodiments of the initiation/termination, negotiation, and transport (feedback) features of the QoE protocol, in the context of defined standards, are described next.

A. Initiation/Termination: RTSP

In an illustrative and non-limiting embodiment, a new RTSP header is defined to enable the PSS client 102 and server 100 to negotiate which Quality of Experience (QoE) metrics that the PSS client 102 should send, how often the metrics should be sent, and how to turn the metrics transmission off. This header can be present in requests and responses of RTSP methods SETUP, SET_PARAMETER, OPTIONS (with Session ID) and PLAY, for example in an RTSP implementation. The header or data therein can be transmitted using other means in non-RTSP implementations. An example header is defined in ABNF [3] as follows:

```
QoE-Header     = "3GPP-QoE-Metrics" ":" ("Off" / Measure-Spec *("," Measure-Spec))
   CRLF
Measure-Spec   = Stream-URL";" ((Metrics ";" Sending-rate [";" Measure-Range] *(";"
   Parameter_Ext])) / "Off")
Stream-URL     = "url" "=" <">Rtsp_URL<">
Metrics        = "metrics" "=" "{"Metrics-Name *("," Metrics-Name) "}"
Metrics-Name   = 1*((0x21..0x2b) / (0x2d..0x3a) / (0x3c..0x7a) / 0x7c / 0x7e) ;VCHAR except
   ";", ",", "{" or "}"
Sending-Rate   = "rate" "=" 1*DIGIT / "End"
Measure-Range  = "range" "=" Ranges-Specifier
Parameter_Ext  = "On"/"Off"/ (1*DIGIT ["." 1*DIGIT]) / (1*((0x21..0x2b) / (0x2d..0x3a) /
   (0x3c..0x7a) / 0x7c /     0x7e))
Ranges-Specifier = as defined in RFC 2326
Rtsp_URL       = as defined in RFC 2326
```

There are two ways to use this header for this specific non-limiting embodiment—the header may be used in other ways with other embodiments:

Using only the "Off" parameter is an indication that either server 100 or client 102 wants to cancel the metrics reporting.
Using other parameters indicates a request to start the metrics transmission.

B. Transport/Feedback: RTSP

In an embodiment, the QoE metrics feedback can be conveyed in requests to the PSS server 100 using the SET_PARAMETER, PAUSE or TEARDOWN methods by the "3GPP-QoE-Feedback" header. One possible example of the header (sent from the client 102 to the server 100) is defined in ABNF [3] as follows:

```
Feedbackheader   = "3GPP-QoE-Feedback" ":" Feedback-Spec *("," Feedback-Spec) CRLF
Feedback-Spec    = Stream-URL 1*(";" Parameters) [";" Measure-Range]
Stream-URL       = as specified in [1]
Parameters       = Metrics-Name "=" "{" SP / (Measure *(","Measure)) "}"
Metrics-Name     = as defined in [1]
Measure          = Value [SP Timestamp]
Measure-Range    = as defined in [1]
Value            = (1*DIGIT ["." *DIGIT]) / 1*((0x21..0x2b) / (0x2d..0x3a) / (0x3c..0x7a) / 0x7c /
     0x7e)       ;VCHAR except ";", ",", "{" or "}"
Timestamp        = NPT-Time
NPT-Time         = as defined in RFC 2326
```

If "Stream-URL" is an RTSP Session Control URL, then "Metrics" applies to the RTSP session. If "Stream-URL" is an RTSP Media Control URL, then "Metrics" apply only to the indicated media component of the session.

QoE metrics with the same "Stream-URL", "Sending-rate" and "Measure-Range" are aggregated within a single "Measure-Spec" declaration. Otherwise, multiple "Stream-URL" declarations are used.

The "Metrics" field contains the list of names that describes the metrics/measurements that are to be reported in a PSS session. The names that are not included in the "Metrics" field are not reported during the session.

The "Sending-Rate" is set, and it expresses the maximum time period in seconds between two successive QoE reports. If the "Sending-Rate" value is 0, then the client 102 decides the sending time of the reports depending on the events occurred in the client 102. Values≧1 indicate a precise reporting interval. The shortest interval is one second and the longest interval is undefined. The reporting interval can be different for different media, but a degree of synchronization can be maintained in order to avoid extra traffic in the uplink direction. The value "End" indicates that only one report is sent at the end of the session.

The optional "Measure-Range" field, if used, defines the time range in the stream for which the QoE metrics will be reported. There is only one range per measurement specification in an example embodiment. The range format can be any of the formats allowed by the media. If the "Measure-Range" field is not present, the corresponding (media or session level) range attribute in SDP is used. If SDP information is not present, the metrics range is the whole session duration. There is only one "3GPP-QoE-Metrics" header in one RTSP request or response in an embodiment.

"Stream-URL" is the RTSP session or media control URL that identifies the media the feedback parameter applies to.

The "Metrics-Name" field in the "Parameters" definition contains the name of the metrics/measurements and uses the same identifiers as the "3GPP-QoE-Metrics" header.

The "Value" field indicates the results. There is the possibility that the same event occurs more than once during a monitoring period. In that case, the metrics value may occur more than once indicating the number of events to the server 100.

The optional "Timestamp" (defined in NPT time) indicates the time when the event occurred or when the metric was calculated. If no events have occurred, it is reported with an empty set (only containing a space).

The optional "Measure-Range" indicates the actual reporting period, for which this report is valid.

QoE metrics reporting is done by the PSS client 102 by using the SET_PARAMETER method, for example. However, for more efficiency, RTSP PAUSE and TEARDOWN methods may also be used in particular cases, such as:

CASE 1: When sending the very last QoE report, the client 102 embeds the QoE information into a TEARDOWN message.

CASE 2: When the client 102 wants to pause the streaming flow, QoE information should be embedded into a PAUSE method. The PSS client 102 should not send any QoE reports to the PSS server 100 when the system is paused, since there is no media flow.

C. Initiation/Termination: SDP

In one embodiment, SDP can be used to initiate the QoE negotiation. The reason why SDP is used is to support the use cases where SDP is distributed through other methods than RTSP DESCRIBE (e.g., WAP, HTTP, or email). A new example SDP attribute, which can be used either at session or media level, is defined below in ABNF based on RFC 2327:

```
QoE-Metrics-line  = "a" "=" "3GPP-QoE-Metrics:" att_measure_spec *(";" att-measure-spec))
   CRLF
att-measure-spec  = Metrics ";" Sending-rate [";" Measure-Range] *([";" Parameter_Ext])
Metrics           = as defined in [1]
Sending-Rate      = as defined in [1]
Measure-Range     = as defined in [1]
Parameter_Ext     = as defined in [1]
```

The server 100 uses this attribute to indicate that QoE metrics are supported and are used if also supported by the client 102. When present at session level, it only contains metrics that apply to the complete session. When present at media level, it only contains metrics that are applicable to individual media. The URI that is used in the specification of the RTSP header "3GPP-QoE-Metrics:" is implicit by the RTSP control URI (a=control).

D. Initiation/Termination: SDP (Example)

This following non-limiting example shows the syntax of the SDP attribute for QoE metrics. The session level QoE metrics description (Initial buffering duration and rebufferings) are monitored and reported once at the end of the session. Also, video-specific description of metrics (corruptions and decoded bytes) are monitored and reported every 15 seconds from the beginning of the stream until the time 40 s, for example, but this timing can be varied as desired from one embodiment to another. Audio specific description of metrics (corruptions) is monitored and reported every 20 seconds, for example, from the beginning until the end of the stream.

EXAMPLE 1

```
Server->Client   RTSP/1.0 200 OK
Cseq: 1
Content-Type: application/sdp
Content-Base: rtsp://example.com/foo/bar/baz.3gp/
Content-Length: 800
Server: PSSR6 Server
v=0
o=-3268077682 433392265 IN IP4 63.108.142.6
s=QoE Enables Session Description Example
e=support@foo.com
c=IN IP4 0.0.0.0
t=0 0
a=range:npt=0-83.660000
a=3GPP-QoE-Metrics:{Initial_Buffering_Duration, Rebuffering_
Duration};rate=End
a=control:*
m=video 0 RTP/AVP 96
b=AS:28
a=3GPP-QoE-Metrics:{Corruption_Duration,Decoded_
Bytes};rate=15;range:npt=0-40
a=control:trackID=3
a=rtpmap:96 MP4V-ES/1000
a=range:npt=0-83.666000
a=fmtp:96profile-level-id=8;config=000001b008000001b50900012000
m=audio 0 RTP/AVP 98
b=AS:13
a=3GPP-QoE-Metrics:{Corruption_Duration};rate=20
a=control:trackID=5
a=rtpmap:98 AMR/8000
a=range:npt=0-83.660000
a=fmtp:98 octet-align=1
a=maxptime:200
```

E. Initiation/Termination: RTSP (Example)

Figure 2:
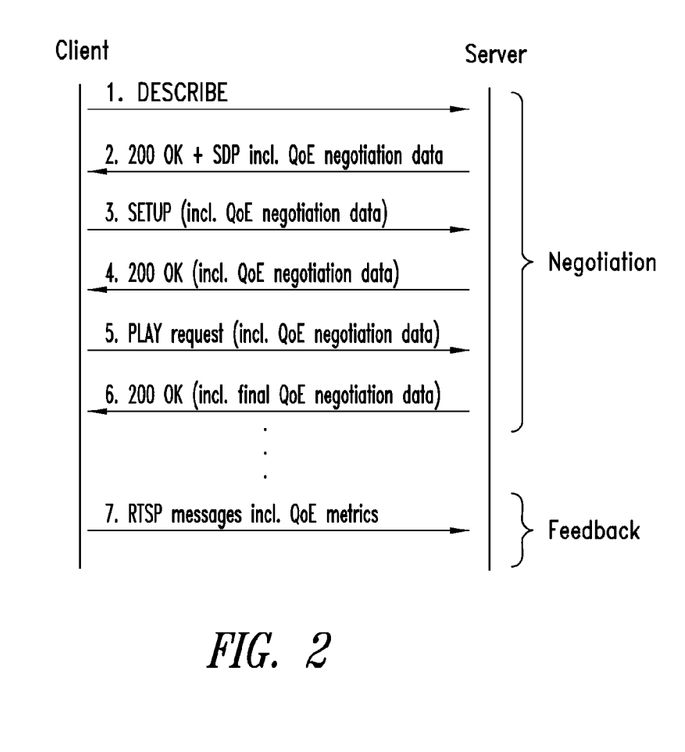
FIG. 2 illustrates a first embodiment of QoE negotiation.

In the example of FIG. 2, it is shown how to negotiate QoE metrics during RTSP session setup. After negotiation, the client 102 can provide measured/collected values of accepted metrics to the server 100 as feedback.

```
Client->Server  SETUP rtsp://example.com/foo/bar/baz.3gp/trackID=
                3 RTSP/1.0 Cseq: 2
                3GPP-QoE-Metrics:url=
                "rtsp://example.com/foo/bar/baz.3gp/trackID=3";
                metrics={Corruption_Duration,Decoded_Bytes};rate=
                10; Range:npt=0-40,
                url="rtsp://example.com/foo/bar/baz.3gp";
                metrics={Initial_Buffering_Duration, Rebuffering_
                Duration};rate=End
```

In the above example SETUP request, the client 102 modifies the sending rate of the QoE metrics for the control URL rtsp://example.com/foo/bar/baz.3gp/trackID=3" from 15 to 10 (compared to the initial SDP description). Assuming that the server 100 acknowledged the changes, the server 100 will send back a SETUP response as follows:

```
Server->Client  RTSP/1.0 200 OK
                Cseq: 2
                Session: 17903320
                Transport: RTP/AVP;unicast;client_port=
                7000-7001;server_port=6970-6971
                3GPP-QoE-Metrics:url=
                "rtsp://example.com/foo/bar/baz.3gp/trackID=3";
                metrics={Corruption_Duration,Decoded_Bytes};rate=
                10;Range:npt=0-40,
                url="rtsp://example.com/foo/bar/baz.3gp";
                metrics={Initial_Buffering_Duration,Rebuffering_
                Duration};rate=End
```

Figure 3:
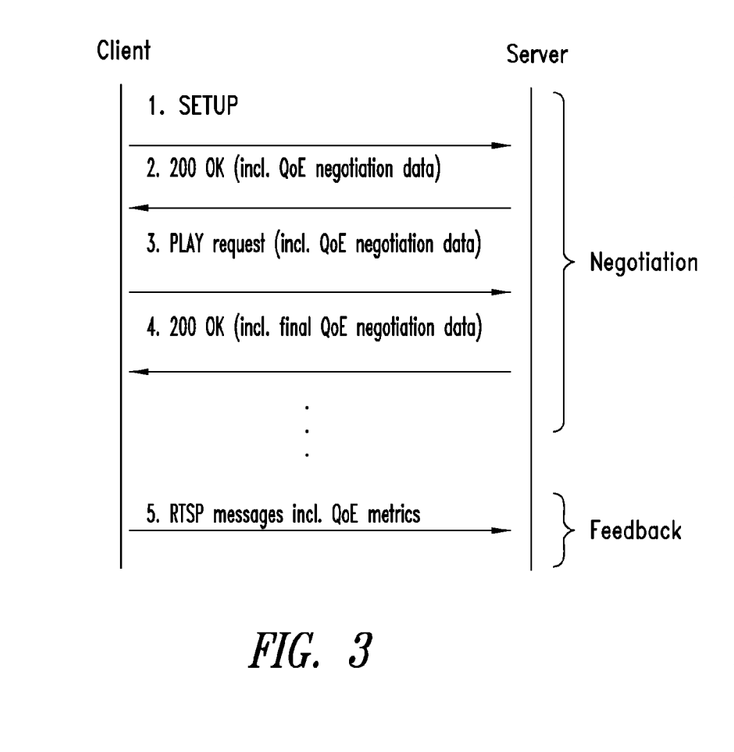
FIG. 3 illustrates a second embodiment of QoE negotiation.

FIG. 3 shows an example QoE metrics negotiation when there is no DESCRIBE-200/OK.

In the example below, the metrics are switched off at the session level (for all media):

```
Client->Server, Server->Client   SET_PARAMETER
                                 rtsp://example.com/foo/bar/baz.3gp
                                 RTSP/1.0
                                 Cseq: 302
                                 Session: 17903320
                                 3GPP-QoE-Metrics: Off
                                 Content-length: 0
```

An example response for setting the metrics off would be:

| | |
|---|---|
| Server->Client, Client->Server | RTSP/1.0 200 OK |
| | Cseq: 302 |
| | Session: 17903320 |
| | 3GPP-QoE-Metrics: Off |

F. Transport/Feedback: RTSP (Example)

Metrics feedback (comprising metric values/data) can be transported or otherwise conveyed from the client 102 to the server 100 using any suitable communication technique. One possible and non-limiting technique is to use the SET_PARAMETER method to convey the feedback to the server 100. The following example shows that during the monitoring time, two (2) corruption periods have occurred. Each value indicates the duration (in milliseconds) of each corruption period.

EXAMPLE 5

Feedback

| | |
|---|---|
| Client->Server | SET_PARAMETER rtsp://example.com/foo/bar/baz.3gp |
| | RTSP/1.0 |
| | Cseq: 302 |
| | Session: 17903320 |
| | 3GPP-QoE-Feedback: |
| | url="rtsp://example.com/foo/bar/baz.3gp/trackID= |
| | 3";Corruption_Duration={200 |
| | 1300} |
| | Content-length: 0 |

The following example shows that during the monitoring time, two (2) corruption periods have occurred. Each values couple indicates the duration (in milliseconds) of each corruption period and the timestamp of the corruption (for example, the first corruption occurred at second 12 and lasted 200 milliseconds).

EXAMPLE 6

Feedback with Timestamps and Range

| | |
|---|---|
| Client->Server | SET_PARAMETER rtsp://example.com/foo/bar/baz.3gp |
| | RTSP/1.0 |
| | Cseq: 302 |
| | Session: 17903320 |
| | 3GPP-QoE-Feedback: url= |
| | "rtsp://example.com/foo/bar/baz.3gp/trackID=3"; |
| | Corruption_Duration={200 12, 1300 16};Range:npt= |
| | 10-20 |
| | Content-length: 0 |

In the following example there are no events to report.

EXAMPLE 7

Feedback with No Events

| | |
|---|---|
| Client->Server | SET_PARAMETER rtsp://example.com/foo/bar/baz.3gp |
| | RTSP/1.0 |
| | Cseq: 302 |
| | Session: 17903320 |
| | 3GPP-QoE-Feedback: |
| | url="rtsp://example.com/foo/bar/baz.3gp/trackID= |
| | 3";Corruption_Duration={ |
| | } |
| | Content-length: 0 |

II. The QoE Metrics

In an embodiment, the PSS client 102 measures the metrics at the transport layer, but may also do so at the application layer for better accuracy. The reporting period for the metrics is the period over which a set of metrics is calculated. The maximum value of the reporting period is negotiated via the QoE protocol. The reporting period does not include any voluntary event that impacts the actual play, such as pause or rewind, or any buffering or freezes/gaps caused by them. In other embodiments, one or more metrics may be measured by elements additionally or alternatively to the client 102, and then conveyed to the server 100 and/or to the client 102.

In an embodiment, at least some of the metrics are indicative of a characteristic that affects quality in the communication environment, or are some other indication or outcome of the communication channel. Such QoE metrics can be measured at the protocol stack of the client 102, application(s) of the client 102, buffers of the client 102, codecs of the client 102, or other client characteristic that can be related to QoE or any combination of the above. The metrics can be used to adjust the behavior at any of these layers at the server 100 and/or at the client 102.

The following example metrics can be derived by the PSS client 102 implementing QoE. It is appreciated that these metrics are not the only metrics that may be used for QoE purposes. These metrics may be supplemented with other metrics, replaced by other metrics, modified, combined, etc. The metrics below are described herein so as to provide a better understanding of operation and features of embodiments of the invention.

All the metrics defined below are applicable to at least one of audio, video, speech and timed text media types, and are not necessarily applicable to other media types such as synthetic audio, still images, bitmap graphics, vector graphics, and text. It is appreciated, however, that other metrics can be provided for these other media types. Any unknown metrics can be ignored by the client 102 and not included in any QoE report, in an embodiment.

A. Corruption Duration Metric

Corruption duration, M, is the time period from the NPT time of the last good frame before the corruption, to the NPT time of the first subsequent good frame or the end of the reporting period (whichever is sooner). A corrupted frame may either be an entirely lost frame, or a media frame that has quality degradation and the decoded frame is not the same as in error-free decoding. A good frame is a "completely received" frame X that:

either it is a refresh frame (does not reference any previously decoded frames AND where none of the subsequent received frames reference any frames decoded prior to X);

or does not reference any previously decoded frames;

or references previously decoded "good frames".

"Completely received" means that all the bits are received and no bit error has occurred.

Corruption duration, M, in milliseconds can be calculated as below in one embodiment:

a) M can be derived by the client 102 using the codec layer, in which case the codec layer signals the decoding of a good frame to the client 102. A good frame could also be derived by error tracking methods, but decoding quality evaluation methods are not used in one embodiment but can be used in another embodiment.

b) In the absence of information from the codec layer, M is derived from the NPT time of the last frame before the corruption and N, where N is optionally signalled from server 100 to client 102, and represents the maximum duration between two subsequent refresh frames in milliseconds.

c) In the absence of information from the codec layer and if N is not signalled, then M defaults to ∞ (for video) or to one frame duration (for audio), or the end of the reporting period (whichever is sooner).

The optional parameter N as defined in point b is used with the "Corruption_Duration" parameter in the "3GPP-QoE-Metrics" header. Another optional parameter T is defined to indicate whether the client 102 uses error tracking or not. The value of T is set by the client. An example and non-limiting syntax for N and T that can be included in the "Measure-Spec" (clause 5.3.2.3.1 of [1]) is as follows:

$N = ``N" `` = ``1*DIGIT$ $T = ``T" `` = ```` ``On"/``Off"$

An example and non-limiting syntax for the "Metrics-Name Corruption_Duration" for the QoE-Feedback header is as defined in clause 5.3.2.3.2 of [1].

The absence of an event can be reported using the space (SP).

For the "Metrics-Name Corruption_Duration", the "Value" field in clause 5.3.2.3.2 indicates the corruption duration. The unit of this metrics is expressed in milliseconds. There is the possibility that corruption occurs more than once during a reporting period. In that case the value can occur more than once indicating the number of corruption events.

The value of "Timestamp" is equal to the NPT time of the last good frame inside the reporting period, in playback order, before the occurrence of the corruption, relative to the starting time of the reporting period. If there is no good frame inside the reporting period and before the corruption, the timestamp is set to the starting time of the reporting period.

B. Rebuffering Duration Metric

Rebuffering is defined as any stall in playback time due to any involuntary event at the client side.

An example and non-limiting syntax for the "Metrics-Name Rebuffering_Duration" for the QoE-Feedback header is as defined in clause 5.3.2.3.2 of [1].

The absence of an event can be reported using the space (SP).

For the "Metrics-Name Rebuffering_Duration", the "Value" field in clause 5.3.2.3.2 indicates the rebuffering duration. The unit of this metrics is expressed in seconds, and can be a fractional value. There is the possibility that rebuffering occurs more than once during a reporting period. In that case the metrics value can occur more than once indicating the number of rebuffering events.

The optional "Timestamp" indicates the time when the rebuffering has occurred since the beginning of the reporting period. The value of the "Timestamp" is equal to the NPT time of the last played frame inside the reporting period and before the occurrence of the rebuffering, relative to the starting time of the reporting period. If there is no played frame inside the reporting period, the timestamp is set to the starting time of the reporting period.

C. Initial Buffering Duration Metric

Initial buffering duration is the time from receiving the first RTP packet until playing starts.

An example and non-limiting syntax for the "Metrics-Name Initial_Buffering_Duration" for the QoE-Feedback header is as defined in clause 5.3.2.3.2 with the exception that "Timestamp" in "Measure" is undefined for this metric. If the reporting period is shorter than the "Initial_Buffering_Duration" then the client should send this parameter for each reporting period as long as it observes it. The "Value" field indicates the initial buffering duration where the unit of this metrics is expressed in seconds, and can be a fractional value. There can be only one "Measure" and it can only take one "Value". The absence of an event can be reported using the space (SP). "Initial_Buffering_Duration" is a session level parameter.

D. Successive Loss of RTP Packets

This parameter indicates the number of RTP packets lost in succession per media channel.

An example and non-limiting syntax for the "Metrics-Name Successive_Loss" for the QoE-Feedback header is as defined in clause 5.3.2.3.2 of [1].

The absence of an event can be reported using the space (SP).

For the "Metrics-Name Successive_Loss", the "Value" field indicates the number of RTP packets lost in succession. The unit of this metric is expressed as an integer equal to or larger than 1. There is the possibility that successive loss occurs more than once during a reporting period. In that case the metrics value can occur more than once indicating the number of successive losses.

The optional "Timestamp" indicates the time when the succession of lost packets has occurred. The value of the "Timestamp" is equal to the NPT time of the last received RTP packet inside the reporting period, in playback order, before the occurrence of the succession of lost packets, relative to the starting time of the reporting period. If there is no received RTP packet inside the reporting period and before the succession of loss, the timestamp is set to the starting time of the reporting period.

If a full run length encoding of RTP losses with sequence number information is desired, RTCP XR [5] Loss RLE Reporting Blocks should be used instead of the successive loss metric.

E. Frame Rate Deviation

Frame rate deviation indicates the playback frame rate information. Frame rate deviation happens when the actual playback frame rate during a reporting period is deviated from a pre-defined value.

The actual playback frame rate is equal to the number of frames played during the reporting period divided by the time duration, in seconds, of the reporting period.

The parameter FR that denotes the pre-defined frame rate value is used with the "Framerate_Deviation" parameter in the "3GPP-QoE-Metrics" header. The value of FR can be set by the server 100. An example and non-limiting syntax for FR to be included in the "Measure-Spec" (clause 5.3.2.3.1 of [1]) is as follows:

$FR = "FR" "=" 1*DIGIT "." 1*DIGIT$

An example and non-limiting syntax for the Metrics-Name "Framerate_Deviation" for the QoE-Feedback header is as defined in clause 5.3.2.3.2 with the exception that "Timestamp" in "Measure" is undefined for this metric. The absence of an event can be reported using the space (SP).

For the Metrics-Name "Framerate_Deviation", "Value" field indicates the frame rate deviation value that is equal to the pre-defined frame rate minus the actual playback frame rate. This metric can be expressed in frames per second, and can be a fractal value, and can be negative. The metric value can occur only once for this metric in one example and non-limiting embodiment.

F. Jitter Duration

Jitter happens when the absolute difference between the actual playback time and the expected playback time is larger than a pre-defined value, which is 100 milliseconds. The expected time of a frame is equal to the actual playback time of the last played frame plus the difference between the NPT time of the frame and the NPT time of the last played frame, in one example embodiment.

An example and non-limiting syntax for the Metrics-Name "Jitter_Duration" for the QoE-Feedback header is as defined in clause 5.3.2.3.2 of [1].

The absence of an event can be reported using the space (SP).

For the Metrics-Name "Jitter_Duration", the "Value" field in 5.3.2.3.2 indicates the time duration of the playback jitter. The unit of this metrics is expressed in seconds, and can be a fractional value. There is the possibility that jitter occurs more than once during a reporting period. In that case the metric value can occur more than once indicating the number of jitter events.

The optional "Timestamp" field indicates the time when the jitter has occurred since the beginning of the reporting period. The value of the "Timestamp" is equal to the NPT time of the first played frame in the playback jitter, relative to the starting time of the reporting period.

III. The QoE Server Module

Figure 4A:
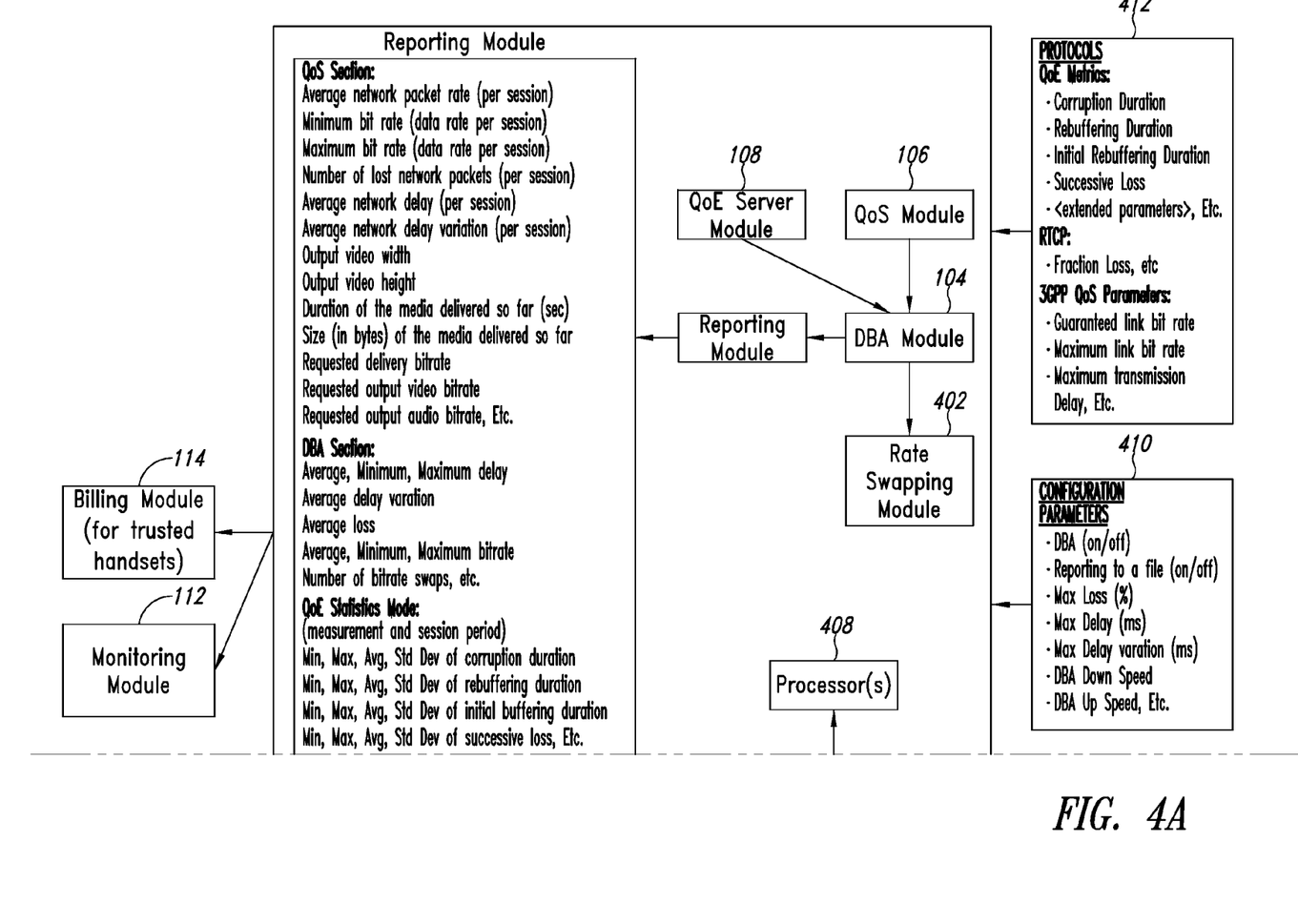
FIG. 4 is a block diagram of an embodiment of a QoE module for the QoE framework of FIG. 1 shown in more detail.
Figure 4B:
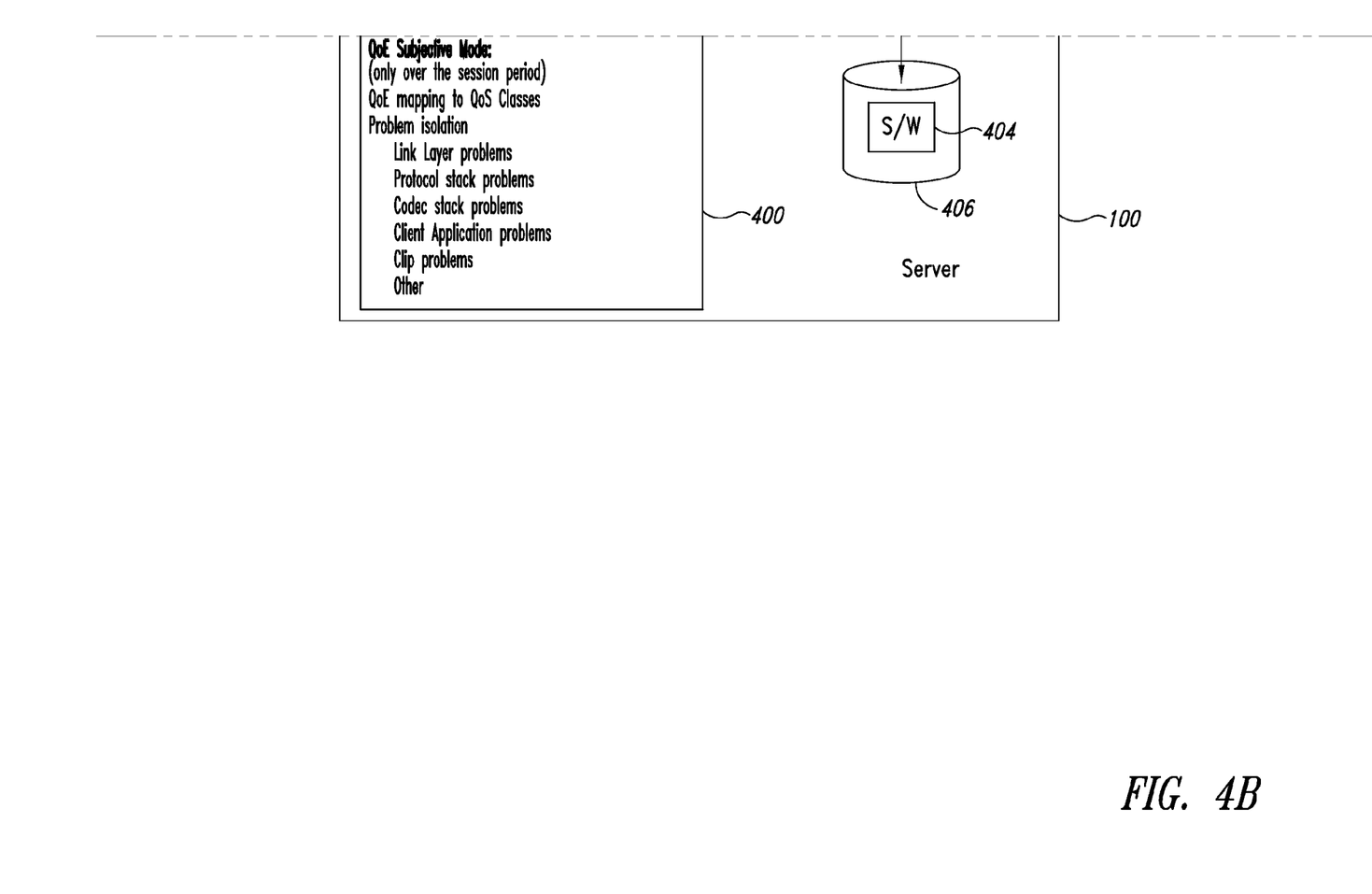

FIG. 4 shows the QoE Server Module 108 within the server 100 according to an embodiment. The QOE Server Module 108 is responsible for quantifying the impact of several factors, including network conditions, client characteristics, etc. on the media being communicated. The QOE Server Module 108 does so by gathering feedback from the client 102.

The characteristics and features of various embodiments of the QoE Server Module 108 can be described as follows:

1. The QoE Server Module 108 can reside on a streaming server (e.g., the server 100).
2. The QoE Server Module 108 can reside on an rtsp proxy or on any other suitable network device.
3. The QoE Server Module 108 can accept input from various protocols 412 such as
   QoE metrics through the QoE Protocol (as explained above and in [1])
   RTCP metrics [4]
   3GPP Link Characteristics [1]
   RTCP XR [5]
4. The QoE Server Module 108 configuration can be stored in an SDP file or generated by the Server/Proxy. Example configuration parameters are shown at 410 in FIG. 4.
5. The QoE Server Module 108 interacts with the DBA module 104:
   To impact decisions to increase bitrate based on statistical QoE result
   To impact decisions to increase bitrate based on subjective QoE result
   To impact decisions to decrease bitrate based on statistical QoE results
   To impact decisions to decrease bitrate based on subjective QoE results
   The following characteristics can also be increased/decreased or other influenced/changed based on subjective and/or statistical QoE results: frame rate, refresh interval and behavior, error resiliency, buffer behavior, maximum frame size, peak bitrate, fragmentation, retransmission, and/or other characteristics.
   If the DBA module 104 is turned on:
     QoE can have an impact on rate adaptation (configurable).
     Reporting is controlled by the DBA module 104, in one embodiment.
   If the DBA module 104 is turned off:
     QoE Server 108 does not have an impact on rate adaptation, in one embodiment, but can have an impact on rate adaptation in another embodiment.
     Reporting is controlled by the QoE Server 108 in one embodiment, and is controlled by other modules or components in another embodiment.
   If both DBA and QoE modules 104 and 108 are turned off, Reporting is controlled by the QoS module 106, in an embodiment.
6. The QoE Server Module 108 can operate in one or both of the following modes:
   Statistics mode
   Subjective mode
   Details: Metrics coming back to the server 100 from the client 102 can be used organized within the QOE Server Module 108 in many ways. One way is the "Statistics mode." Here, the QOE Server Module 108 is organizing the statistics of the metrics in the form of minimum, maximum etc. A second way is the "Subjective mode." Here, the QOE Server Module 108 is organizing the metrics it received by mapping them to a Quality of Service class. Therefore, for example, after looking at the metrics, the QOE Server Module 108 may determine that a particular metric belongs to the MEDIUM quality class. As such, this information could be used for validation purposes. For example, if the client 102 subscribed to a HIGH quality class but for this particular session based on the metrics the server 100 received, it was determined that this session only belonged to the MEDIUM quality class, then such information is useful for a number of purposes. There could potentially be a number of other analysis of the metrics the QOE Server Module 108 receives.

7. The QoE Statistics Mode:
   Computed at media or session level
   Measured over a single period or the whole session
   Computes minimum, maximum, average and std deviation of at least:
   Corruption duration (as explained above and in [1])
   Rebuffering duration (as explained above and in [1])
   Initial buffering duration (as explained above and in [1])
   Successive Loss (as explained above and in [1])
8. The QoE Subjective Mode:
   Computed at media or session level
   Measured over the whole session (no single period reports)
   Provides a mapping to a predefined QoS-class
   Best-effort or Streaming Class,
   Low, Medium, or High QoE Class.
   Provides an isolation of the possible problem location:
   Link layer
   Network protocol stack
   Codec stack problem
   Client application problem
   Clip problem
   Other
9. QoE reports can be integrated to a
   Monitoring system
   Billing system (if the handset is authenticated)

In an embodiment, the DBA module 104, QoS module 106, and QoE Server Module 108 can together comprise part of a reporting module 400. There may be additional modules located at the server 100, such as a rate swapping module 402. For the sake of brevity, detailed description of such additional modules will not be provided herein.

At least some of the QoE-related and other operations described above can be embodied in software or other machine-readable instruction 404 stored on one or more machine-readable medium 406. Such machine-readable media 406 can be located at the server 100, at the client 102, and/or at some other suitable network location. One or more processors 408 are coupled to the storage medium 406 to allow the processor 408 to execute the software 404 stored thereon.

IV. The QoE Client Module

The QoE Client Module 118 of one embodiment is based in the client 102.

The QoE Client Module 118 can decide to switch the QoE metrics ON/OFF for a session based on any number of considerations. One such consideration is, for example, low battery power that may hinder its regular operation.

The QoE Client Module 118 can turn OFF the metrics in the middle of the session after it had decided to turn it ON at the beginning of the session. This decision may be influenced by a number of reasons, including the ineffectiveness of the metrics it is collecting or other reasons.

The QoE Client Module 118 can pick and choose, from the set of metrics that it supports, which ones to support for a particular session. This decision can be influenced by the complexity of computing the metrics, past experience, or other considerations. Such metric selection can be used for negotiation with the server 100.

The QoE Client Module 118 can choose to selectively turn OFF certain metrics in the middle of the session after it had agreed to measure them at the beginning of the session. The QoE Client Module 118 can also select the frequency of reporting such metrics. Frequency selection can be used for negotiation with the server 100. The QoE Client Module 118 can select the range of the session over which the metrics shall be measured. Range selection can be used for negotiation with the server 100. The QoE Server Module 108 and/or the QoE Client Module 118 of an embodiment can change the list of metrics, the level of metrics (media/session), the frequency of the metrics, and the range of the metrics during the session.

The QoE Client Module 118 can dynamically measure or otherwise obtain metric values "on-the-fly" while decoding or processing media received from the server 100. Results from the decoding and/or processing cycles can be used during the metric gathering process.

The QoE Client Module 118 can gather data at various levels (e.g., application, network, codec, or others). The QoE Client Module 118 can then use such data collectively to determine some of the metrics.

The QoE Client Module 118 can distinguish between voluntary and involuntary action of the client 102 that has a bearing on Quality of Experience. The QoE Client Module 118 can maintain the integrity of the metrics that it has measured. The QoE Client Module 118 can select the means of transport of these metrics if such a choice is available.

In an embodiment, the QoE Client Module 118 can change the configuration of the metrics while still collecting them (e.g., frequency and the range of the metrics). The metrics can be also applicable to session level, stream level media (e.g., audio, video, separately or jointly).

At least some of the QoE-related and other operations described above can be embodied in software or other machine-readable instruction 404 stored on one or more machine-readable medium 406. Such machine-readable media 406 can be located at the server 100, at the client 102, and/or at some other suitable network location. One or more processors 408 are coupled to the storage medium 406 to allow the processor 408 to execute the software 404 stored thereon. Various components, such as the modules at the server 100 and/or client 102 can be embodied in software (or other machine-readable instruction), hardware, and/or a combination of both.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments, including what is described in the Abstract, is not intended to be exhaustive or to limit the invention to the precise forms disclosed. While specific embodiments and examples are described herein for illustrative purposes, various equivalent modifications are possible within the scope of the invention and can be made without deviating from the spirit and scope of the invention.

For example, while the various embodiments have been described herein in the context of certain specific communication protocols, standards, formats, syntax, and the like, other embodiments can be provided for other types of communication protocols, standards, formats, syntax, and the like. The invention is not limited to the specific communication protocols, standards, formats, syntax, and the like that are described herein. Embodiments are applicable not only to audio and video media streaming, but also to other forms of media delivery and consumption.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method usable in a communication environment, the method comprising:
    defining a plurality of quality of experience (QoE) metrics indicative of a characteristic that affects quality in the communication environment;
    performing a negotiation between a client and a server to determine at least one of the plurality of QoE metrics to be used during a session between the client and the server, wherein said negotiation is performed prior to play of media to start said session;
    designating said determined at least one QoE metric as at least one accepted QoE metric, said performing the negotiation performed prior to play of said media to start said session including:
        identifying which of the plurality of QoE metrics is supported by either the server or the client, or both;
        determining a manner to deactivate said determined at least one QoE metric during the session;
        modifying a particular QoE metric and re-negotiating the modified particular QoE metric to determine if said modified particular QoE metric is supported for the session; and
        rejecting a proposed QoE metric, including said modified particular QoE metric, if said proposed QoE is not supported by either or both the server or client;
    collecting metric data for said at least one accepted QoE metric during the session; and
    communicating the collected metric data between the client and the server.

2. The method of claim 1 wherein said communication environment includes a wireless communication environment.

3. The method of claim 1 wherein said communication environment includes a hardwired communication environment.

4. The method of claim 1 wherein said collecting metric data for said at least one accepted QoE metric during the session includes dynamically collecting the metric data at the client during the session as the client decodes or processes said media, which is received from the server.

5. The method of claim 1 wherein said defining the plurality of QoE metrics includes defining one or more QoE metrics involving: corruption duration, rebuffering duration, initial buffering duration, successive packet loss, frame rate deviation, and jitter duration.

6. The method of claim 1 wherein said communicating the collected metric data between the client and the server includes receiving the collected metric data in one or more packets sent from the client to the server.

7. The method of claim 1 wherein said performing the negotiation between the client and the server prior to play of media to start said session further includes:
    acknowledging receipt of said proposed QoE metric during the negotiation;
    determining a manner to communicate said determined at least one QoE metric during the session;
    determining a frequency of communication of said determined at least one QoE metric during the session;
    determining a configuration of said determined at least one QoE metric; and
    determining parameters of metric values.

8. The method of claim 1, further comprising evaluating the collected metric data and applying the evaluated collected metric data.

9. The method of claim 8 wherein said evaluating the collected metric data includes organizing the collected metric data according to statistics and subjective modes.

10. The method of claim 1 wherein said defining the plurality of QoE metrics includes defining an individual QoE metric associated with the client.

11. A system usable in a communication environment, the system comprising:
    means for defining a plurality of quality of experience (QoE) metrics indicative of a characteristic that affects quality in the communication environment, including a client characteristic;
    means for performing a negotiation between a client and a network device to determine at least one of the plurality of QoE metrics to be used during a session between the client and the network device, and for designating said determined at least one QoE metric as at least one accepted QoE metric, wherein said negotiation is performed prior to play of media to start said session, said negotiation performed prior to play of said media to start said session including:
        identification of which of the plurality of QoE metrics is supported by either the network device or the client, or both;
        determination of a manner to deactivate said determined at least one QoE metric during the session;
        modification of a particular QoE metric and re-negotiation of the modified particular QoE metric to determine if said modified particular QoE metric is supported for the session; and
        rejection of a proposed QoE metric, including said modified particular QoE metric, if said proposed QoE is not supported by either or both the server or client; and
    means for communicating metric data of the at least one accepted QoE metric between the client and the network device during the session.

12. The system of claim 11 wherein the communication environment includes a wireless communication environment.

13. The system of claim 11 wherein the network device includes a server.

14. The system of claim 11 wherein the means for defining the plurality of QoE metrics defines one or more QoE metrics involving: corruption duration, rebuffering duration, initial buffering duration, successive packet loss, frame rate deviation, and jitter duration.

15. The system of claim 11 wherein the means for performing the negotiation includes a QoE module means for analyzing the collected metric data, the system further comprising:

a dynamic bandwidth adaptation (DBA) module means for interacting with the QoE module means to make decisions related to quality based on the analyzed collected metric data;
a quality of service (QoS) module means for performing reporting alternatively or additionally to the QoE module means; and
monitoring and billing module means for evaluating the collected metric data.

16. The system of claim 11, further comprising client-side QoE module means for:
determining whether to switch the at least one accepted QoE metric ON/OFF for the session based on at least one consideration;
turning OFF the at least one accepted QoE metric during the session after having turned ON the at least one accepted QoE at a beginning of the session;
selecting a frequency of reporting the metric data;
selecting a range of the session over which the at least one accepted QoE metric is to be measured;
selecting a level of the at least one accepted QoE metric, including media and session levels;
dynamically obtaining the metric data while decoding or processing said media, which is received from the network device;
obtaining the metric data at various levels, including application, network, and codec levels;
distinguishing between voluntary and involuntary action of the client that has an affect on QoE;
maintaining an integrity of the QoE metrics that have been obtained;
selecting a means for transporting the metric data; and
changing a configuration of the QoE metrics while still collecting their respective metric data.

17. An article of manufacture usable in a wireless communication environment, the article of manufacture comprising:
a storage medium having instructions stored thereon that are executable by a processor to:
define a plurality of quality of experience (QoE) metrics indicative of a characteristic associated with the wireless communication environment, including a client characteristic;
perform a negotiation between a client and a server to determine at least one of the plurality of QoE metrics to be used during a session between the client and the server, wherein said negotiation is performed prior to play of media to start said session;
designate said determined at least one QoE metric as at least one accepted QoE metric, said negotiation performed prior to play of said media to start said session including:
identification of which of the plurality of QoE metrics is supported by either the server or the client, or both;
determination of a manner to deactivate said determined at least one QoE metric during the session;
modification of a particular QoE metric and re-negotiating the modified particular QoE metric to determine if said modified particular QoE metric is supported for the session; and
rejection of a proposed QoE metric, including said modified particular QoE metric, if said proposed QoE is not supported by either or both the server or client; and
obtain metric data for said at least one accepted QoE metric during the session.

18. The article of manufacture of claim 17 wherein the instructions to obtain the metric data include instructions executable by said processor to receive the metric data as part of packets communicated from the client.

19. The article of manufacture of claim 17 wherein the storage medium is located at the server.

20. The article of manufacture of claim 17 wherein the instructions to perform the negotiation prior to play of media to start said session further include instructions executable by said processor to:
acknowledge receipt of said proposed QoE metric during the negotiation;
determine a manner to communicate said determined at least one metric during the session;
determine a frequency of communication of said determined at least one QoE metric during the session;
determine a configuration of said determined at least one QoE metric; and
determine parameters of metric values.

21. The article of manufacture of claim 17 wherein the instructions to obtain the metric data for said at least one accepted QoE metric during the session include instructions to obtain metric data related to any one or more QoE metrics involving: corruption duration, rebuffering duration, initial buffering duration, successive packet loss, frame rate deviation, and jitter duration.

22. The article of manufacture of claim 17 wherein the storage medium further includes instructions stored thereon that are executable by said processor to evaluate the obtained metric data and to apply the evaluated obtained metric data.

23. The article of manufacture of claim 22 wherein the instructions to apply the evaluated obtained metric data include instructions executable by said processor to change any one or more of: bitrate, frame rate, refresh interval and behavior, error resiliency, buffer behavior, maximum frame size, peak bitrate, fragmentation, retransmission, and other QoE characteristic.

24. The article of manufacture of claim 22 wherein the instructions to apply the evaluated obtained metric data include instructions executable by said processor to:
change either or both a characteristic of the server or the client characteristic;
use the evaluated obtained metric data for billing;
use the evaluated obtained metric data for reporting and monitoring; or
use the evaluated obtained metric data in accordance with a subjective mode.

25. An apparatus usable in a communication environment, the apparatus comprising:
a quality of experience (QoE) module adapted to perform a negotiation between a client and a server to determine which at least one QoE metric from among a plurality of QoE metrics is to be used during a session between the client and the server, wherein said negotiation is performed prior to play of media to start said session, said determined at least one QoE metric being designated as at least one accepted QoE metric, the QoE module further being adapted to communicate collected metric data, corresponding to the at least one accepted QoE metric, between the client and the server during the session,
wherein said negotiation performed by said QoE module prior to play of said media to start said session includes:
identification of which of the plurality of QoE metrics is supported by either the server or the client, or both;
determination of a manner to deactivate said determined at least one QoE metric during the session;

modification of a particular QoE metric and re-negotiating the modified particular QoE metric to determine if said modified particular QoE metric is supported for the session; and rejection of a proposed QoE metric, including said modified particular QoE metric, if said proposed QoE is not supported by either or both the server or client.

26. The apparatus of claim 25 wherein the QoE module is located at the client and is further adapted to collect the metric data while said media, which is received from the server, is being decoded or processed.

27. The apparatus of claim 25 wherein the QoE module is located at the server, the apparatus further comprising at least another module adapted to cooperate with the QoE module to apply the collected metric data for at least one purpose.

28. The apparatus of claim 25 wherein said negotiation by the QoE module prior to play of said media to start said session further includes:

acknowledgement of receipt of said proposed QoE metric during the negotiation;

determination of a manner to communicate said determined at least one QoE metric during the session;

determination of a frequency of communication of said determined at least one QoE metric during the session;

determination of a configuration of said determined at least one QoE metric; and determination of parameters of metric values.

29. The method of claim 1 wherein said performing the negotiation between the client and the server prior to play of said media to start said session further includes:

initiating the negotiation;

accepting or rejecting an initial QoE metric;

determining a range of said session over which said determined at least one QoE metric is to be measured;

determining a level of said determined at least one QoE metric; and terminating the negotiation if certain conditions are met, including mutual agreement on final said at least one accepted QoE metric.

30. The system of claim 11 wherein said negotiation performed prior to play of said media to start said session further includes:

initiation of the negotiation;

acceptance or rejection of an initial QoE metric;

determination of a range of said session over which said determined at least one QoE metric is to be measured;

determination of a level of said determined at least one QoE metric; and termination of the negotiation if certain conditions are met, including mutual agreement on final said at least one accepted QoE metric.

31. The system of claim 11 wherein said negotiation performed prior to play of said media to start said session further includes:

acknowledgement of receipt of said proposed QoE metric during the negotiation;

determination of a manner to communicate said determined at least one QoE metric during the session;

determination of a frequency of communication of said determined at least one QoE metric during the session;

determination of a configuration of said determined at least one QoE metric; and determination of parameters of metric values.

32. The article of manufacture of claim 17 wherein the instructions to perform the negotiation prior to play of said media to start said session further include instructions executable by said processor to:

initiate the negotiation;

accept or reject an initial QoE metric;

determine a range of said session over which said determined at least one QoE metric is to be measured;

determine a level of said determined at least one QoE metric; and terminate the negotiation if certain conditions are met, including mutual agreement on final said at least one accepted QoE metric.

33. The apparatus of claim 25 wherein said negotiation by the QoE module performed prior to play of said media to start said session further includes:

initiation of the negotiation;

acceptance or rejection of an initial QoE metric;

determination of a range of said session over which said determined at least one QoE metric is to be measured;

determination of a level of said determined at least one QoE metric; and termination of the negotiation if certain conditions are met, including mutual agreement on final said at least one accepted QoE metric.

* * * * *

UNITED STATES PATENT AND TRADEMARK OFFICE
CERTIFICATE OF CORRECTION

PATENT NO. : 7,599,307 B2
APPLICATION NO. : 10/924740
DATED : October 6, 2009
INVENTOR(S) : Seckin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1107 days.

Signed and Sealed this

Twenty-eighth Day of September, 2010

David J. Kappos
*Director of the United States Patent and Trademark Office*